US011883354B2

(12) United States Patent
Hennessy

(10) Patent No.: US 11,883,354 B2
(45) Date of Patent: Jan. 30, 2024

(54) HYDROTHERAPY SOAKING CHAIR AND METHOD FOR USE

(71) Applicant: SoSoak, LLC, Cincinnati, OH (US)

(72) Inventor: Paula Jo Hennessy, Cincinnati, OH (US)

(73) Assignee: SOSOAK, LLC, Cincinnati, OH (US)

( * ) Notice: Subject to any disclaimer, the term of this patent is extended or adjusted under 35 U.S.C. 154(b) by 33 days.

(21) Appl. No.: 17/385,376

(22) Filed: Jul. 26, 2021

(65) Prior Publication Data

US 2021/0346239 A1 Nov. 11, 2021

Related U.S. Application Data

(63) Continuation-in-part of application No. 17/100,774, filed on Nov. 20, 2020, now Pat. No. 11,071,413, which is a continuation-in-part of application No. 16/825,452, filed on Mar. 20, 2020, now Pat. No. 10,849,821.

(60) Provisional application No. 62/824,714, filed on Mar. 27, 2019.

(51) Int. Cl.
*A61H 35/00* (2006.01)

(52) U.S. Cl.
CPC ..... *A61H 35/00* (2013.01); *A61H 2201/0149* (2013.01); *A61H 2201/1635* (2013.01)

(58) Field of Classification Search
CPC ............ A61H 35/00; A61H 2201/0149; A61H 2201/1635
USPC .......................................................... 4/578.1
See application file for complete search history.

(56) References Cited

U.S. PATENT DOCUMENTS

| | | | | | |
|---|---|---|---|---|---|
| 3,648,296 | A * | 3/1972 | Craft | A47K 3/022 | 4/444 |
| D330,461 | S * | 10/1992 | Stevens | D6/365 | |
| 5,539,939 | A * | 7/1996 | Gesse | A47K 3/022 | 4/573.1 |
| 10,849,821 | B2 * | 12/2020 | Hennessy | A47K 3/282 | |
| 11,071,413 | B2 * | 7/2021 | Hennessy | A61H 33/6005 | |
| 2010/0176645 | A1 * | 7/2010 | Zanettin | A47K 3/122 | 297/452.21 |

* cited by examiner

*Primary Examiner* — Huyen D Le
(74) *Attorney, Agent, or Firm* — DINSMORE & SHOHL LLP

(57) ABSTRACT

A soaking chair comprising: a seat surface and a support structure; wherein the chair is designed for use in a shower; and wherein the seat surface comprises a soaking reservoir. The chair provides hydrotherapy to the anogenital, hip, buttocks, and/or lower back areas.

20 Claims, 15 Drawing Sheets

HYDROTHERAPY SOAKING CHAIR AND METHOD FOR USE

CROSS REFERENCE TO RELATED APPLICATIONS

This application is a continuation-in-part of prior application Ser. No. 17/100,774, filed Nov. 20, 2020, which was a continuation-in-part of prior application Ser. No. 16/825,452, filed Mar. 20, 2020, which claimed the benefit of U.S. provisional patent application 62/824,714, filed Mar. 27, 2019; the disclosures of which are hereby incorporated by reference in their entirety.

BACKGROUND OF THE INVENTION

1. Field of the Invention

The disclosed invention relates to a hydrotherapy soaking chair. Specifically, the hydrotherapy soaking chair may be used instead of a sitz bath to clean, relieve pain, and/or provide therapeutic treatment to an individual's anogenital area, buttocks, lower abdomen, hips, and/or lower back.

2. Description of the Related Art

A sitz bath is a method of delivering hydrotherapy to the anogenital area. An effective sitz bath increases blood flow to the affected area, and significantly reduces pain and discomfort while facilitating a faster recovery. A sitz bath can also provide relief for easing chronic conditions that cause pain, discomfort and skin irritations. A sitz bath may be given to oneself or a caregiver may assist in giving one. Sitz baths are indicated to promote healing and provide relief for many conditions that affect the genitourinary and skeletal systems of both men and women and is also a crucial component in aiding healing after a vaginal birth or hemorrhoid surgery. In addition, sitz baths are indicated for incontinency that is associated with IBS (irritable bowel syndrome), nerve damage, para- or quadriplegic, and cognitive incontinency (stroke, Alzheimer's, and dementia).

If not provided by a medical facility or medical professional, an in-toilet sitz bath kit may be purchased online or at a local pharmacy for around ten to twenty dollars. The sitz bath kit comprises a small, shallow plastic basin that sits on top of a ring-shaped toilet bowl (not on top of the closed toilet cover or on top of the thin toilet seat). The sitz bath kit also typically includes a plastic bag attached to a tube which requires the user to fill the bag and basin.

The following is the typical procedure for preparing an in-toilet sitz bath: 1) thoroughly scrub the toilet bowl and rim with a bleach solution to remove all fecal bacteria, 2) allow adequate time to air dry, 3) fill the basin with warm water from a bathtub or sink faucet, 4) fill reservoir bag and attach tubing to back of basin, 5) carry the basin, reservoir bag, and tubing to the toilet (be careful not to spill water on the floor around the toilet during transfer, as this represents a fall risk), 6) place basin directly on the hard, cold, porcelain toilet bowl and find a place to hang the reservoir bag (or sit it on the toilet tank), 7) add any desired therapeutic additives to the basin and stir. The following is the typical procedure for using an in-toilet sitz bath: 1) sit directly on the basin and release the clamp on the water bag to allow water to flow into the basin until water reaches the rear overflow slots (the basin easily overflows onto the bathroom floor due to poor design, again representing a fall risk), 2) soak for the prescribed time (typically 20-30 minutes), 3) carefully stand up and dry off the soaked body parts (be careful not to drip water on the bathroom floor, again representing a fall risk). The following is the typical procedure for cleaning an in-toilet sitz bath: 1) empty the contents of the basin into the toilet (be careful to avoid splashing and spillage of water, additives, and debris), 2) pour water and bodily fluids into toilet, 3) wipe basin with antibacterial wipe, and 4) thoroughly scrub the toilet bowl and rim with a bleach solution to remove all fecal bacteria.

There are many downsides to this frequently-used in-toilet sitz bath. It requires sitting on a receptacle intended for urine and feces. A user should repeatedly disinfect the toilet, possibly adding additional stress to a patient already in pain. If the toilet is not properly disinfected prior to using it for a sitz bath, the toilet can spread bacteria to the user. Sometimes, when an individual sits on the in-toilet sitz bath, his back touches the underside of the raised toilet lid (again, germ issues). A basin which removably sits on top of a toilet, bench, legs, or other stand is inherently unsafe because the basin may slip out of place and become detached from the base. And, the uncomfortable sitting position the in-toilet sitz bath instigates can add additional pressure to areas of body it is supposed to heal, potentially reducing the desired healing effects. Prolonged sitting on a firm porcelain bowl can lead to extreme discomfort from nerve and/or arterial compression and decreased blood flow to the lower extremities. One size fits all renders it useless for larger patients because the basin is too small of an area to provide proper water contact with the skin surface for a therapeutic sitz bath. For example, an obese patient's perineal area may fill the entire basin, leaving no room for water circulation. An in-toilet sitz bath requires a proper fit of the basin to the toilet bowl, which is often problematic due to a variety of toilet bowl shapes. The basin must be filled with water and then carried to a toilet. An in-toilet sitz bath can pose a significant fall risk to a user, patient, and/or caregiver due to spillage during the filling, use, or emptying of the basin. One must be careful to avoid splashing of water, additives, and debris when emptying the basin into the toilet. Cut-outs generally present in the basin (for the function of draining the water and bodily fluids into the toilet while the sitz bath is in use) often overflow and spill water directly onto the floor creating a fall risk for both patient and caregiver. In-toilet sitz baths lack access to an efficient water supply and a floor drain. Further, in-toilet sitz baths lack temperature control of the water (e.g., may be hard to keep the water at a therapeutic temperature) and do not provide a circulating water benefit (which is hydrotherapy).

As one can see, this in-toilet sitz bath is not convenient nor comfortable. Many patients who attempt in-toilet sitz bath therapy are confused about how to properly use the basin and bag system, think it is degrading to sit on top of a toilet soaking, or try it once and don't obtain therapeutic results worth the effort. Non-compliance of this recommended hydrotherapy is high due to the inconvenience and ineffectiveness. In addition, in-toilet sitz baths aren't deep enough or wide enough to accommodate a patient's hips or lower back; they barely provide relief to the anogential area. In sum, the most-used method of taking a sitz bath—placing a basin of water on a toilet bowl—is outdated, unsanitary, ineffective, inefficient, undesired, and poses a fall risk.

There are other methods for taking a sitz bath. While taking a bath in a bathtub (or other large basin) may seem obvious, there are many problems with this method. For example, the person taking the sitz bath usually has some kind of medical condition that causes pain and/or immobility. This pain and/or immobility may make it hard or impossible for the person to lower himself or herself down onto the floor of the bathtub. Getting back up and out of the bathtub can also be difficult. Similarly, sitz bath basins intended for use inside of a bathtub exist, but these basins lack armrests necessary for lowering oneself onto the basin and require a patient to squat to soak, thereby putting pressure on the areas of the body it is supposed to be healing. Furthermore, squatting is impossible for many patients.

Another method is using a sitz bath chair. Such chairs are not widely used; they are not meant for use inside a shower or tub. Rather, they are intended for bedside use in a hospital. Because of this, they lack the privacy required for a stress-free, therapeutic sitz bath. They pose a significant fall risk to the patient/caregiver due to spillage when transferring a soaking basin from where it is filled (usually at a sink) to the chair. They are hard to clean since they lack access to a floor drain to dispose of wastewater. In addition, these chairs do not have a means to circulate fresh water to keep the water temperature within a desired therapeutic range. Complicated electronic hydrotherapy chairs exist, but, since they are large and cannot be used inside a bathtub or shower, they do not provide benefits like privacy, close proximity to water source and drain, etc. These electronic hydrotherapy chairs are very expensive and therefore unaffordable to the underserved patient, hospital, or nursing home. In addition, these chairs are difficult for a user to enter and exit.

Shower chairs exist to help injured, disabled, elderly, etc. people shower more safely and easily. Some shower chairs offer flat bench-like seating; these may pose a fall risk for the compromised patient due to their tipping tendencies. Other shower chairs offer a slight curved seat (generally concave but sometimes convex) for drainage and safety. But, regardless of their form, existing shower chairs do not comprise a basin or reservoir for providing the soaking necessary to provide a therapeutic benefit.

Accordingly, a need exists for a sitz bath that enables safe, easy, and convenient use and cleaning. A need exists for a sitz bath that can be placed in a shower stall or bathtub at chair height and will not be prone to tipping over. A need exists for a sitz bath that provides a temperature-controlled water source and a floor drain in close proximity. A need exists for a sitz bath that provides the privacy required for a therapeutic, stress-free soak. A need exists for a sitz bath that can circulate fresh water and keep the water temperature within a desired therapeutic range. A need exists for a reasonably-priced sitz bath. A need exists for a sitz bath that enables soaking of the anogenital region, buttocks, lower abdomen, hips, and lower back (herein, the "lower torso") rather than just the anogenital region. A need exists for a chair which maintains the desired water temperature.

SUMMARY OF THE INVENTION

The present invention is directed to a hydrotherapy soaking chair (involving the use of temperature-controlled water for pain relief and/or treatment) that overcomes one or more of the aforementioned shortcomings of the prior art. The soaking chair comprises a seat surface and a support structure; wherein the seat surface comprises a reservoir capable of retaining water to provide hydrotherapy to the anogenital, hip, buttocks, and/or lower back areas.

BRIEF DESCRIPTION OF THE FIGURES

The drawings and detailed description that follow are intended to be merely illustrative and are not intended to limit the scope of the invention as contemplated by the inventors. The detailed description of specific embodiments of the present invention can be best understood when read in conjunction with the following drawings.

DETAILED DESCRIPTION OF THE INVENTION

Figure 1:
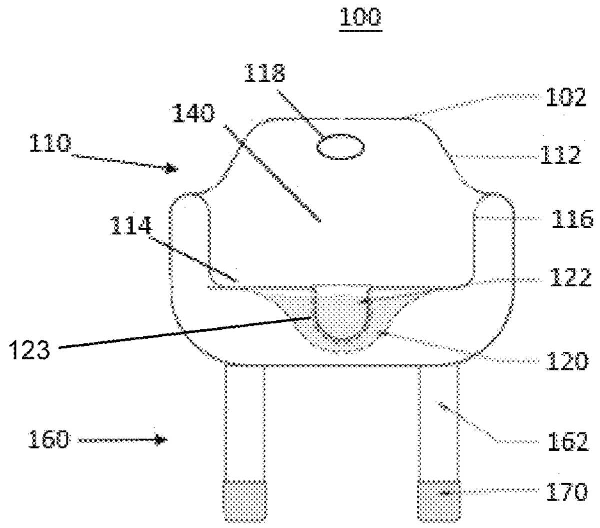
FIG. 1 is a front view of a first embodiment of a soaking chair.

The inventor conceived of a novel soaking chair that overcomes one or more of the aforementioned shortcomings of the prior art. While the disclosed applications of the inventor's hydrotherapy soaking chair satisfy a long-felt but unmet need for providing a safe and effective method for providing hygiene to the geriatric and/or disabled patient and those taking sitz baths for acute or chronic conditions, it should be understood that the inventor's hydrotherapy soaking chair is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

As used herein, "hydrotherapy" means using water to clean, provide pain relief, and/or provide therapeutic treatment to the human body. The temperature and pressure that water provides can stimulate blood circulation and treat symptoms of certain diseases. Disclosed herein is a hydrotherapy soaking chair designed to replace traditional in-toilet sitz baths; the soaking chair may be used in a shower stall or bathtub. When "shower" is used herein, it is intended to encompass use in a bathtub as well, and vice versa. The soaking chair offers many benefits over the prior art, including that it offers temperature-controlled hydrotherapy, the use of a drain for sanitary reasons, and eliminates the reliance on a toilet. There is no need to repeatedly disinfect a toilet and fecal contamination of wounds from contact with an unsanitary toilet can be avoided. Also, since a basin of water does not need to be carried from a sink to a toilet, the soaking chair greatly reduces the fall risks associated with the traditional in-toilet sitz bath (risks from slipping on spilled water as well as falling off the toilet).

The new chair may treat a larger area of the body than a traditional in-toilet sitz bath, including the lower back and hips. The ergonomically designed soaking chair provides hydrotherapy to the anogenital, hip, buttocks, and/or lower back areas, thereby increasing blood flow promoting healing and providing relief. Variations of the chair may focus on various areas needing hydrotherapy. Accordingly, reservoirs in different chairs may comprise different shapes and dimensions for various areas. The soaking chair is designed for a comfortable and relaxing experience; it decreases potential for nerve and blood vessel compression. The calming effects of a warm bath for patients with sensory issues, dementia and anxiety-fueled aggression are well documented. The design of the chair cradles the patient, discouraging falls while comfortably submerging the hips, buttocks, low back, and/or anogenital area in warm (or cool) circulating water, providing the patient relief and promoting good hygiene which can be difficult in certain patient populations (e.g., geriatric, disabled, post-partum, hemorrhoid, cancer).

The soaking delivers the benefits of hydrotherapy to many patients that are traditionally underserved, such as the geriatric and/or disabled patient. In one example, the chair allows an immobile patient to soak his anogenital area and loosen crusted fecal matter such that the anogenital area may be thoroughly cleaned with ease. Also, the soaking chair allows the patient or caregiver to more easily and safely clean the patient's lower torso since the patient is fully supported by the chair. In another example, the soaking chair allows an incontinent patent to enjoy hydrotherapy. Incontinence can lead to bacterial and fungal infections, inflammation, dermatitis (or diaper rash), maceration, pain, etc. The soaking chair is perfect for cancer patients, especially those suffering from horrific diarrhea as result of chemotherapy. The soaking chair delivers therapy to patients easily, safely, and efficiently with the possibility of tremendous results and improvement in quality of life.

The soaking chair can be offered in various sizes, for instance, a small chair to accommodate pediatric patients, a medium chair to accommodate adults, and a large chair to accommodate bariatric patients. Larger patients may be more likely to use a soaking chair that looks sturdy and right-sized for them (whereas before they may have been hesitant to sit on a tiny plastic basin on a toilet seat for fear of falling, discomfort, or crushing the basin). In some embodiments, the soaking chair could be modifiable in size to accommodate a wide variety of patient sizes. When a chair is too wide for a patient, foam inserts, wedges, or towels may be placed near the arm rests to narrow the chair and stabilize and comfort the patient.

The soaking chair allows a sitz bath to be taken in the privacy of a shower stall or bathtub. The soaking chair can fit in any standing shower or bathtub. The soaking chair may be sized specifically for bathtubs, specifically for showers, or it may be sized to be safe and functional in both locations. While the soaking chair will most commonly be used by a patient who is naked from at least the waist down, it may also be used by individuals wearing a swimsuit or the like. For instance, if the soaking chair is used by a post-partum mother at home, she may wear a swimsuit bottom while soaking in case family members can see her. Or, a physical therapy patient may wish to wear a swimsuit while he completes a hydrotherapy soak at his physical therapy center or fitness club.

After use, the soaking chair may be drained directly into an existing floor drain in the shower stall or bathtub; this helps avoid spills onto the bathroom floor. The soaking chair is easy to clean with antibacterial wipes, sprays, or the like. The soaking chairs may be designed to stack. In some embodiments, the bucket seats may be decoupled/decouplable from the support structures to allow for easy shipping and/or storage. In addition, the soaking chair may be used as a replacement for standard shower chairs. In one embodiment, the soaking chair provides a soaking functionality generally and is modifiable to provide a draining shower chair functionality when desired. In another embodiment, the soaking chair provides a draining shower chair functionality generally and is modifiable to provide a soaking functionality when desired. These benefits will be especially helpful if a large number of soaking chairs are in use in hospitals, skilled nursing facilities, long-term acute care facilities, physical therapy centers, or the like.

For all of the above reasons, the new soaking chair delivers a far superior and safer sitz bath compared to any other method currently on the market.

Figure 19:
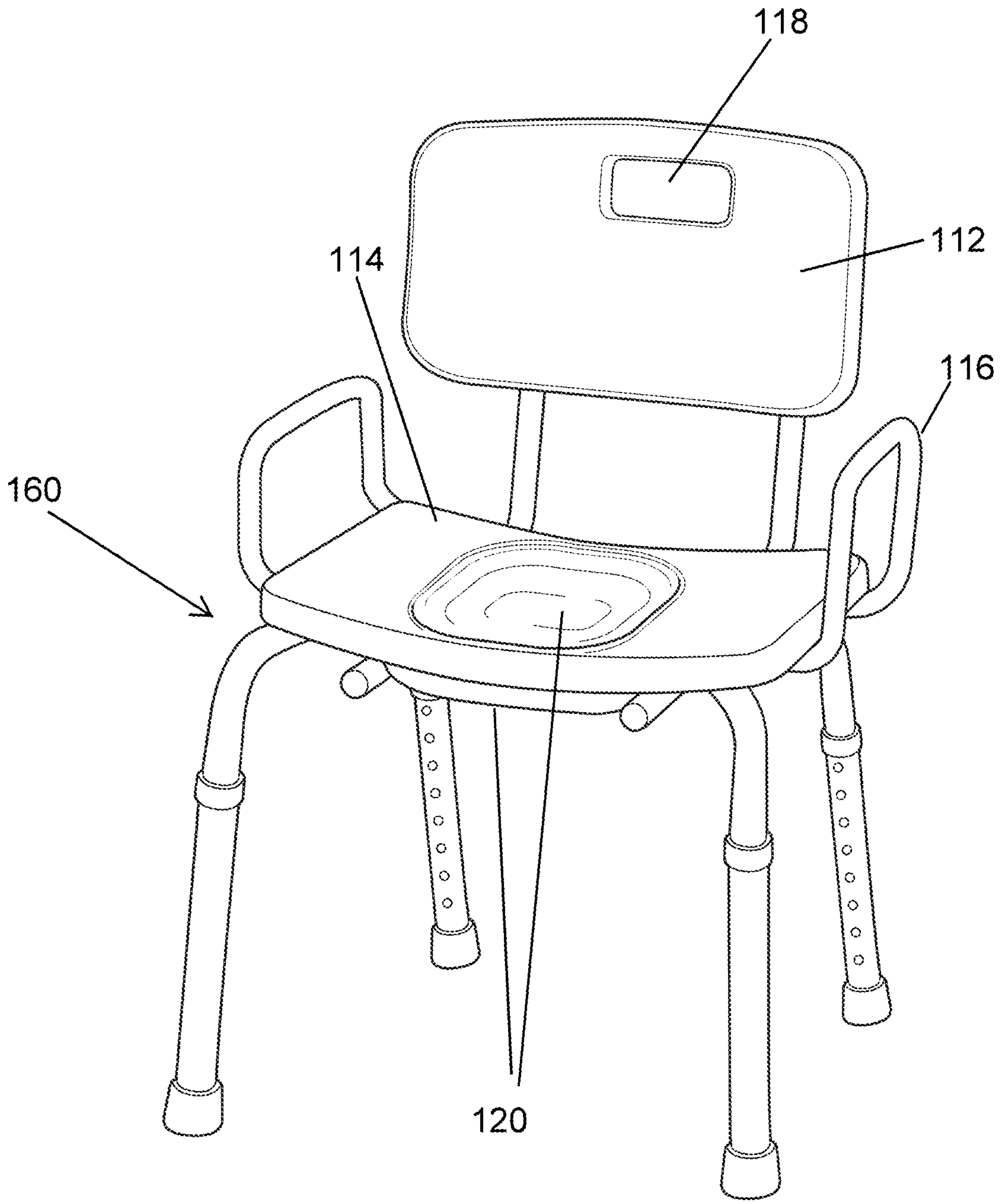
FIG. 19 is a front perspective view of another embodiment of a soaking chair.

FIG. 1 shows a first embodiment of a hydrotherapy soaking chair 100 comprising a bucket seat 110 and a support structure 160. In a preferred embodiment, the bucket seat 110 comprises a seat back 112, a seat surface 114, and armrests 116 that are integral. In other embodiments, one or more of the seat back 112, seat surface 114, and armrests 116 is not integral. If the armrests 116 are not integral, such as shown in FIG. 19, armrests may be hinged and moveable (e.g., can rotate out of the way to allow for better access into and out of the chair), fixed, removable, or combinations thereof.

In a preferred embodiment, the bucket seat 110 is molded via injection molding, blow molding, or the like. This creates an ergonomically comfortable bucket seat 110 in which a patient may relax comfortably and safely. In a preferred embodiment, the bucket seat 110 is double-walled; the void 138 inside the walls maintains the desired water temperature (e.g., warm, cold) for a unique user experience. In a preferred embodiment, the bucket seat 110 material is lightweight, medical-grade polypropylene. In another embodiment, the bucket seat 110 material is polyurethane and provides a cushiony seating surface. However, the bucket seat 110 may be made from any kind of plastic, FDA-approved material, polyurethane, polypropylene, recyclable material, reclaimed material (such as ocean plastic), and combinations thereof. In some embodiments, the chair comprises anti-bacterial material.

Figure 17:
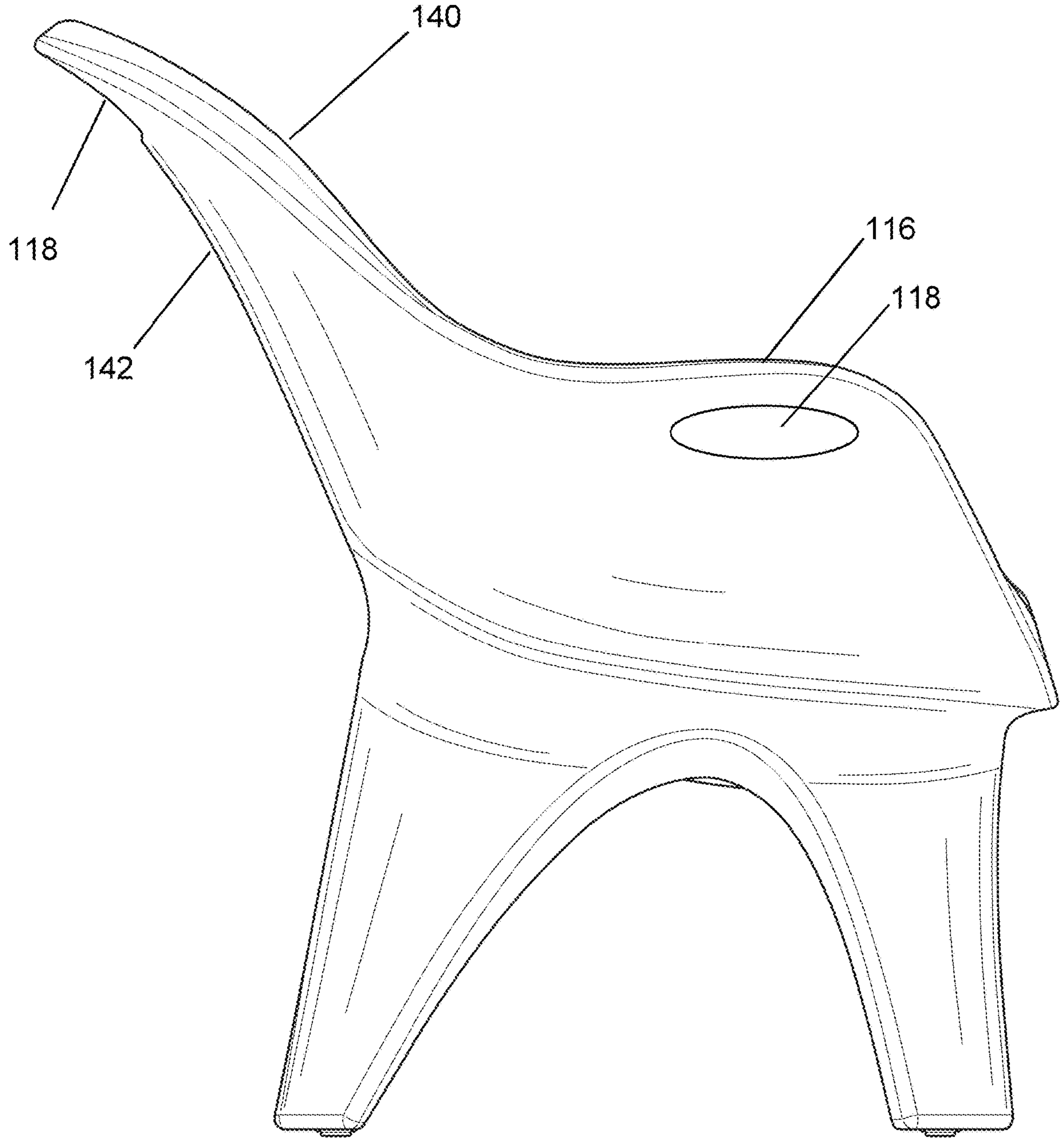
FIG. 17 is a side view of another embodiment of a soaking chair.
Figure 18:
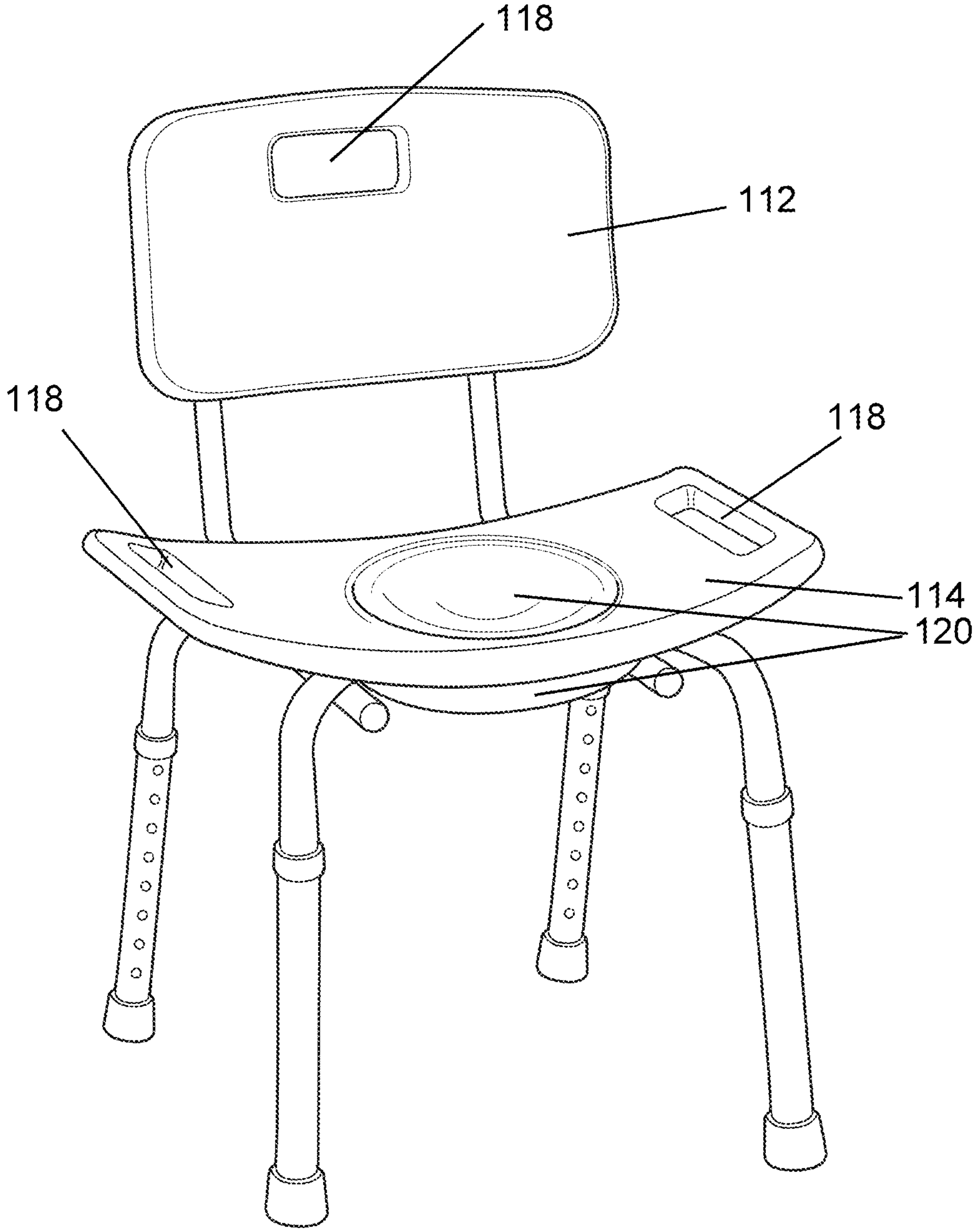
FIG. 18 is a front perspective view of another embodiment of a soaking chair.
Figure 20:
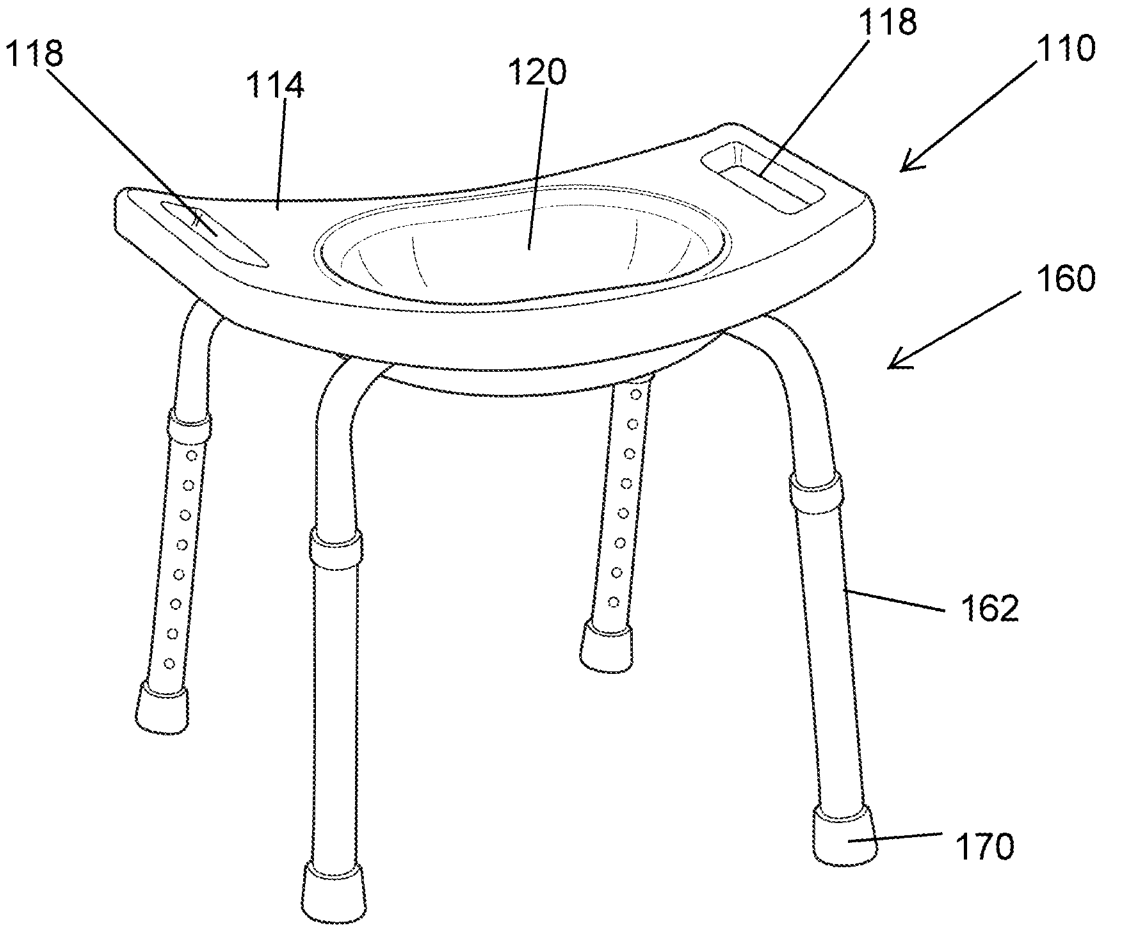
FIG. 20 is a front perspective view of another embodiment of a soaking chair.

The bucket seat 110 may comprise one or more handles 118 to make it easy to remove from the shower and carry to the next location and provide stability for patient transfer and during use. The handles 118 may also provide stability to patients while in use. The handles 118 may be formed by negative spaces in the seat back and/or armrests. The handles 118 may be cut-outs in the chair or they may be more of an indentation into one surface of the chair without being open through to the opposite chair surface. In a preferred embodiment, as shown in FIG. 17, there is one indented handle 118 in the back wall 142 of the seat back 112 near the top edge 102 of the soaking chair (that does not go all the way through the chair to the front wall 140) as well as cut-out handles 118 in each of the armrests 116 (that do go all the way through the armrests 116). In another embodiment, there are cutout handles 118 in the seat back and seat surface 114, as shown in FIG. 18. FIG. 19 shows one handle 118 in the seat back while FIG. 20 shows two handles 118 in the seat surface 114.

The bucket seat 110 may be any color. In some embodiments, it may be white or grey or another neutral color and intended to blend in with the environment in which it is used. In other embodiments, it is a non-neutral color and intended to contrast with the environment in which it is used. For example, the bucket seat 110 may be a non-neutral color selected from the group consisting of: red, orange, yellow, green, blue, purple, pink, and combinations thereof. A non-neutral-color seat may provide visual cues to visually-impaired users or users with dementia, which can, for example, help them identify the soaking chair, help them position themselves on the soaking chair, and help prevent falling. In a preferred embodiment, the bucket seat 110 material is blue in color.

In another embodiment, the seat back 112 and seat surface 114 are integrally molded while the armrests 116 are made out of a different material, such as aluminum. The armrests 116 may or may not be padded. Armrests 116 provide patient comfort or safety when sitting or transitioning into or out of the soaking chair. The armrests may include hand grips to provide stability for patient transfer and during use. The hand grips may be generally staple-shaped, or they may be vertical posts, or the like.

Figure 2:
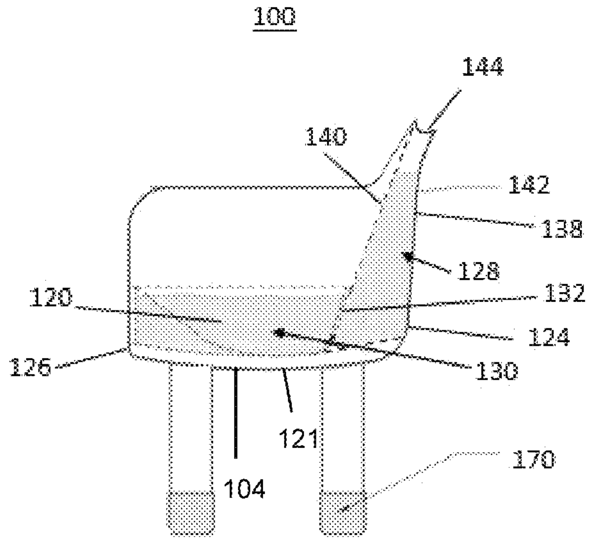
FIG. 2 is a side view of a first embodiment of a soaking chair.
Figure 3:
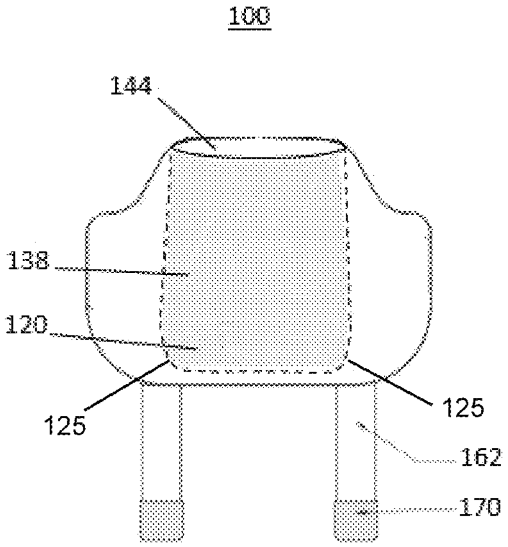
FIG. 3 is a back view of a first embodiment of a soaking chair.
Figure 15:
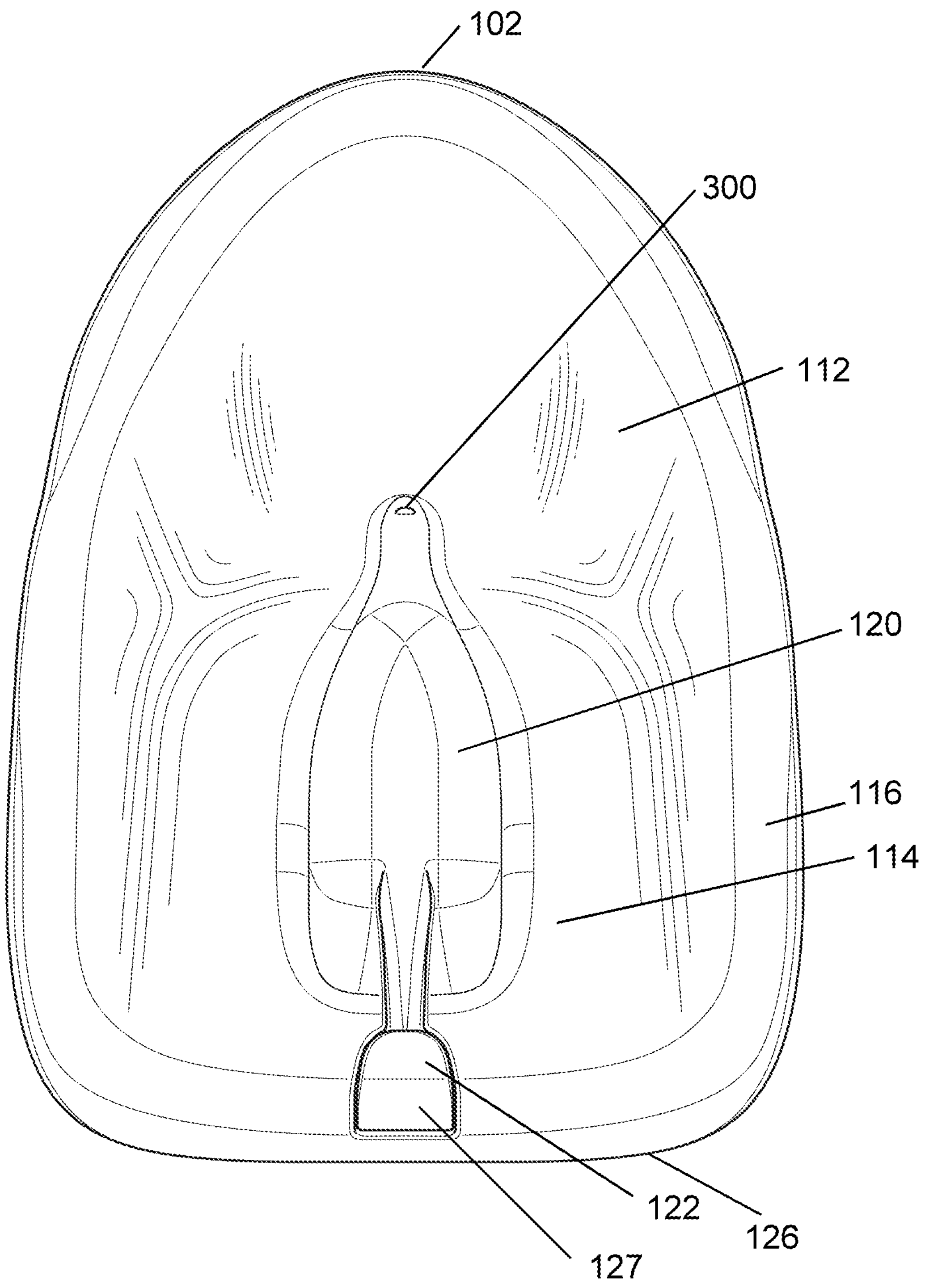
FIG. 15 is a top view of the third embodiment of the soaking chair.
Figure 16:
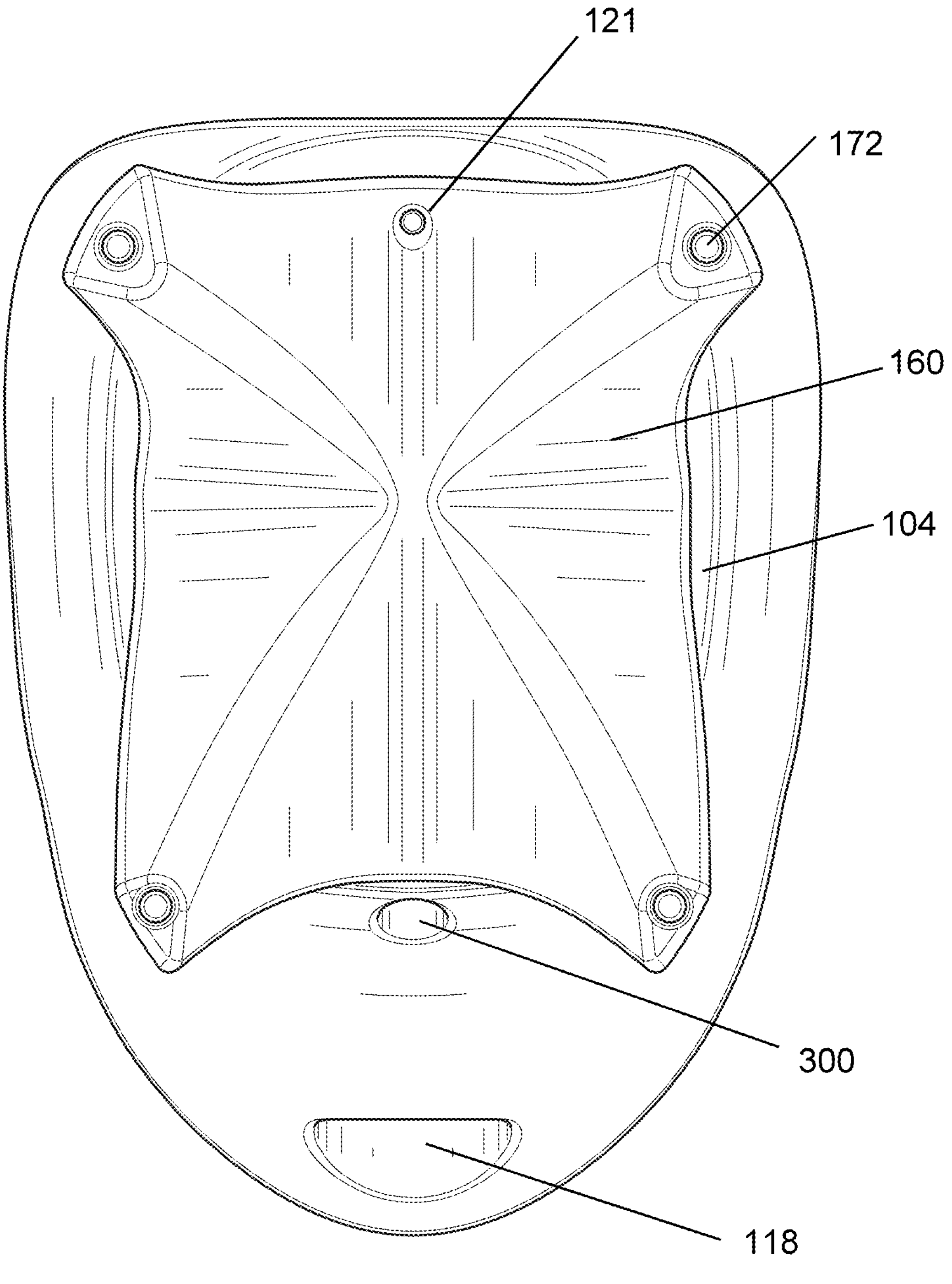
FIG. 16 is a bottom view of the third embodiment of the soaking chair.

Turning to FIG. 2, the seat surface 114 comprises a reservoir 120. The reservoir 120 may be from about 2 to about 12 inches deep, or from about 4 to about 6 inches deep, or from about 6 to about 8 inches deep, or from about 4 to 8 inches deep. In a preferred embodiment, the reservoir 120 is up to about 5 inches deep. The reservoir 120 comprises a surface area suitable for the body part intended to benefit from hydrotherapy. Accordingly, the reservoir 120 may take many different shapes and sizes. In one embodiment, as shown in FIG. 15, the reservoir 120 is generally oblong and measures about 6 inches wide and about 12 inches long, and is oriented with the length of the reservoir centered with a user's anogenital region.

The reservoir 120 accommodates water and add-ins (such as medicine, salts, etc.). The seat surface 114 may be parallel to the ground or it may be angled (aggressively or slightly) towards the rear end 124 of the seat surface 114 to encourage more water to pool in and around the reservoir 120. Angling the seat surface 114 so that the rear end 124 of the seat surface 114 is lower to the ground than the front end 126 of the seat surface 114 may also help a patient remain safely seated (some patients are prone to losing their balance and falling out of chairs). The material of the bucket seat 110 in regions other than the reservoir 120, low back region 128, and hip region 130 may comprise a mesh/perforated pattern to reduce the weight and cost of the soaking chair.

After use, the reservoir 120 is easily drained by tipping the soaking chair towards a shower drain, by unplugging or unstopping a drain, by lifting a drain plug, or by a combination thereof. In one embodiment, the soaking chair 100 does not comprise a drain or a drain plug; rather, the reservoir 120 is designed to effectively and efficiently empty all of the contents of the reservoir simply by tipping forward. This may be the preferred embodiment for a fecal incontinent patient who may be prone to having a bowel movement after coming into contact with warm water. Exemplary embodiments of tippable chairs are shown in FIGS. 18-20.

In some embodiments, the soaking chair 100 comprises a pour spout 123 akin to a measuring cup pour spout to control drainage of liquid from the reservoir 120. This can aid emptying when the soaking chair 100 is tipped to release the contents of the reservoir 120.

In some embodiments, the soaking chair 100 comprises a pluggable, or stoppable, drain 121. The drain 121 may be located in any number of places inside the reservoir 120, but in one embodiment, the drain 121 is located at the lowest point of the reservoir 120, for instance, the middle bottom, the front bottom, or the rear bottom of the seat surface 114, to control drainage of liquid from the reservoir 120. In a preferred embodiment, the drain 121 is located near the front bottom of the soaking chair 100.

Figure 12A:
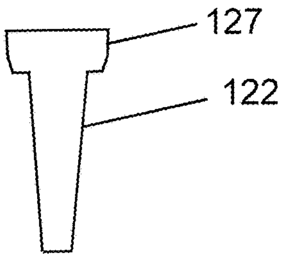
FIG. 12A is a front view of a drain plug for use with the third embodiment of the soaking chair.
Figure 12B:
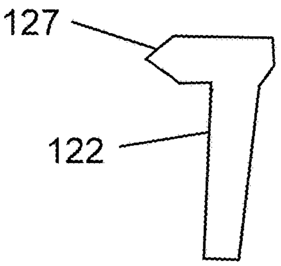
FIG. 12B is a side view of a drain plug for use with the third embodiment of the soaking chair.
Figure 12C:
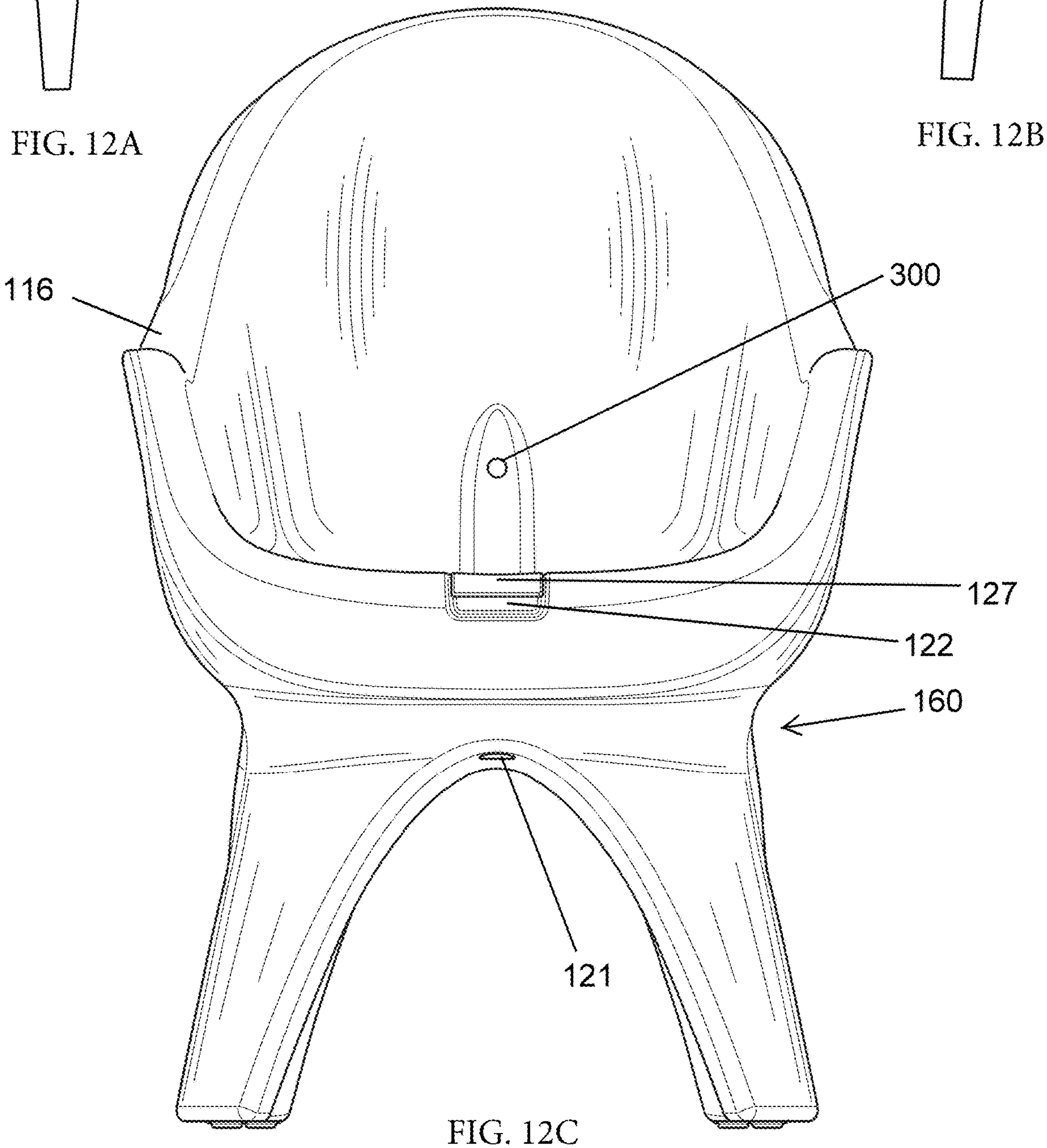
FIG. 12C is a front view of the third embodiment of the soaking chair, showing the drain plug in a lowered position.
Figure 13:
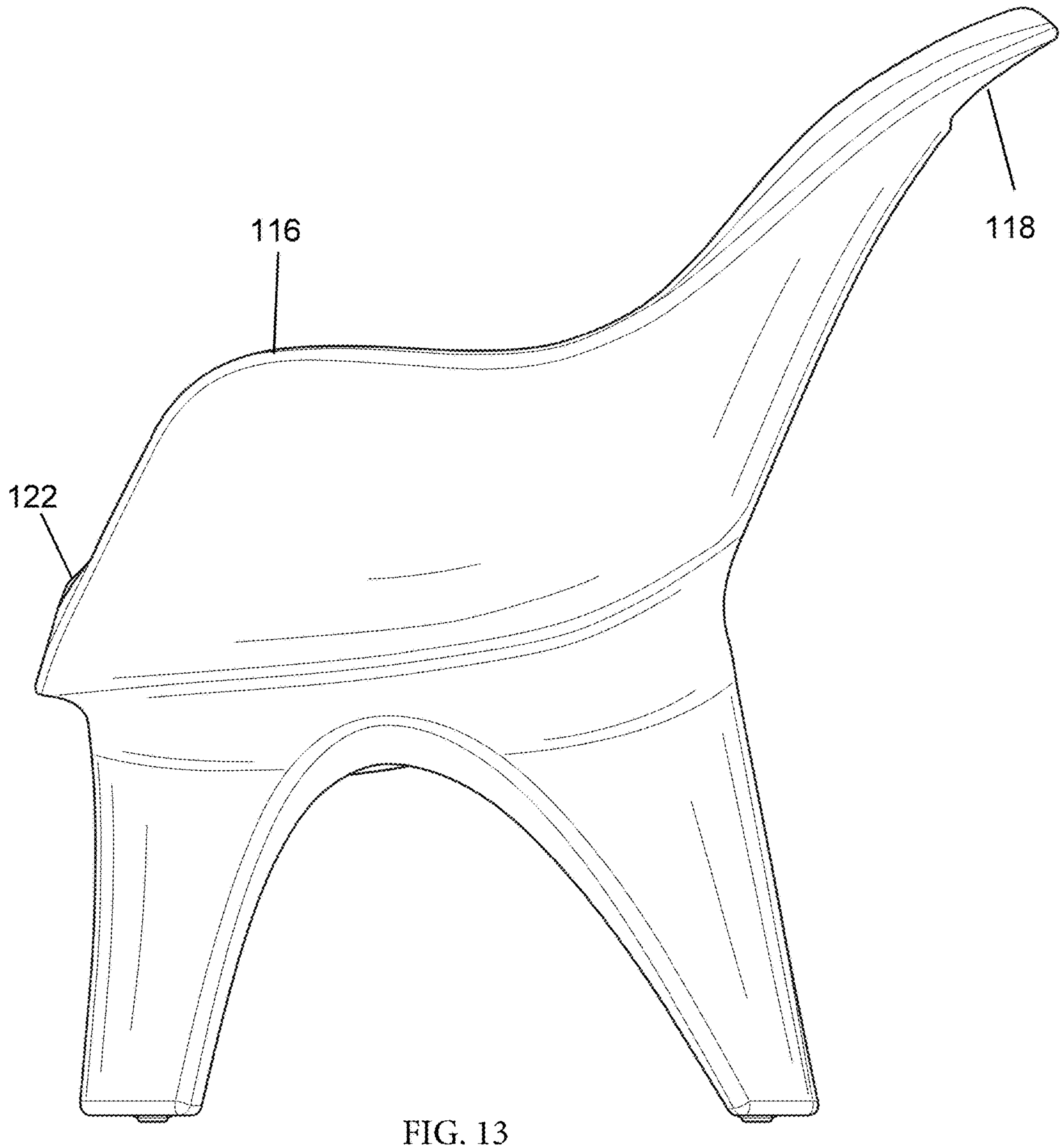
FIG. 13 is a side perspective view of the third embodiment of the soaking chair.
Figure 14:
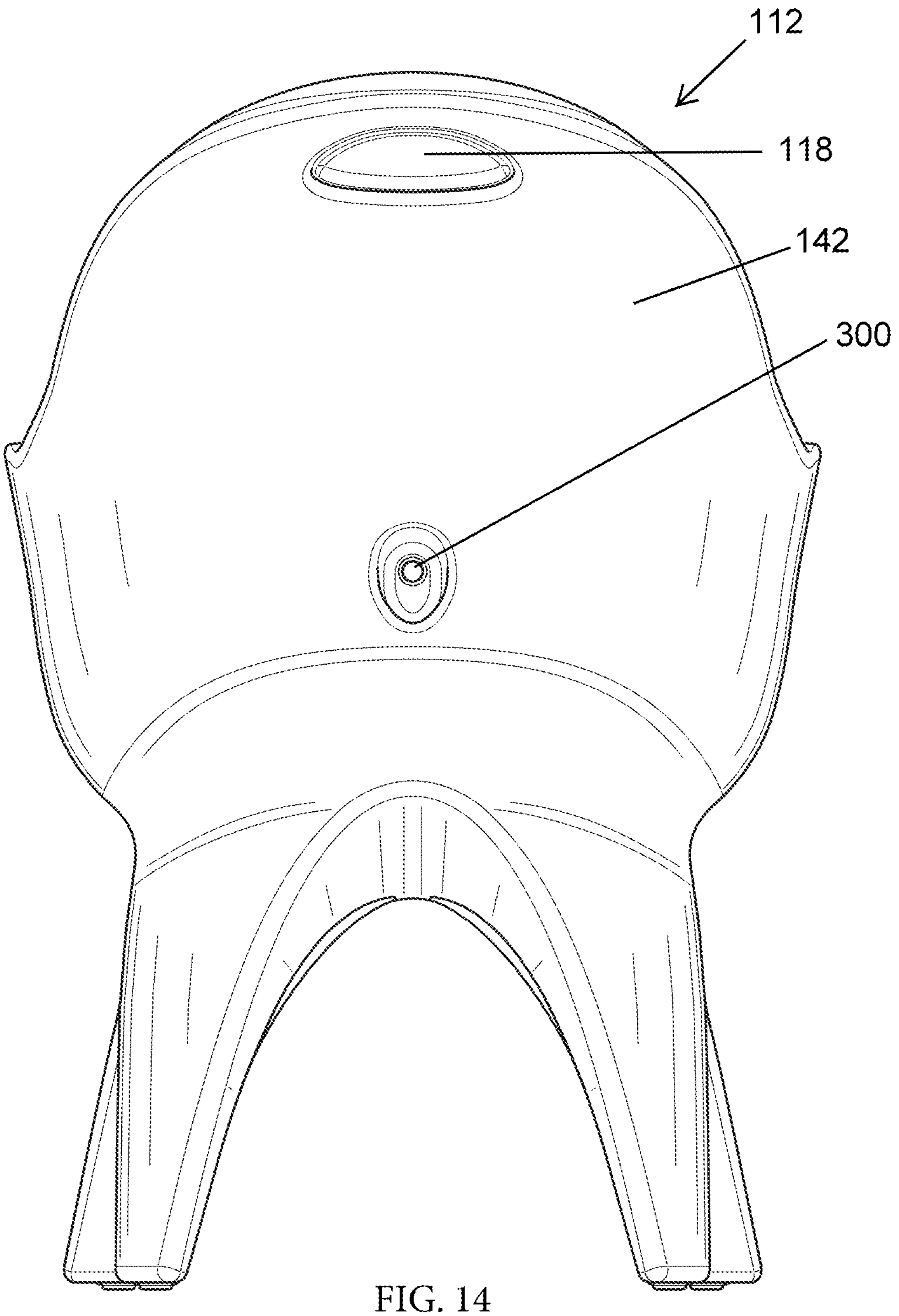
FIG. 14 is a back view of the third embodiment of the soaking chair.

In some embodiments, the soaking chair 100 comprises a movable water-tight drain plug 122 to plug the drain 121 in order to keep water in the reservoir 120 and control drainage of liquid from the reservoir 120. The drain plug 122 may pivot, tilt, lift, comprise a barrier arm, completely disconnect, or the like. In a preferred embodiment, the drain plug 122 is placed in a lowered, water-sealing position 134 during filling and usage of the soaking chair and placed in a raised, water-flowing position 136 during draining and cleaning the soaking chair. The drain plug 122 may be lifted periodically to accommodate fresh water in the reservoir 120. One or more drain plugs 122 may be located near the rear end 124 of the seat surface 114, the front end 126 of the seat surface 114, the sides of the seat surface 125, the bottom of the seat surface 104, or combinations thereof. In a preferred embodiment, as shown in FIGS. 12A-12C, the drain plug 122 is located at the front end 126 of the seat surface 114. FIG. 12A shows a front view of the drain plus 122, FIG. 12B shows a side view of the drain plug 122, and FIG. 12C shows the drain plug 122 in a lowered position 134. The drain plug 122 may comprise a portion 127 which enables easier grasping for plugging and unplugging the drain 121. In other embodiments, the soaking chair 100 comprises two drain plugs 122: one at the front end 126 of the seat surface 114 and another at the rear end 124 of the seat surface 114. Drain plug placement may be associated with level of user care needed, for instance, no drain plug or drain plug in front when the chair user requires no assistance to empty the reservoir 120, or a drain plug in back or on a side when caregiver must be able to easily drain reservoir 120 (e.g., for the cognitively and/or physically disabled patient or the obese patient who can't reach between their legs). If the drain plug is located in a hard-to-reach location, a handle or lever may be added to enable easier movement of the drain plug.

As shown in FIG. 2, the seat surface 114 may comprise a water opening 132 near the intersection of the seat back 112 and the seat surface 114. If present, the water opening 132 is in fluid communication with the reservoir 120 and allows the reservoir 120 to be filled with water through the seat back 112.

There are various ways to accomplish the filling of the soaking chair. In the first embodiment, the soaking chair 100 is double-walled with a void 138 between a front wall 140 and a back wall 142, as shown in FIG. 2. In a preferred embodiment, as shown in FIGS. 10-16, the void 138 is present inside the bucket seat 110 and the void 138 is not in fluid communication with the reservoir 120; rather, the empty space in the void 138 serves to help maintain a desired water temperature while soaking. In this preferred embodiment, a hose connection port 300 is present in a lower portion of the seat back 112 of the bucket seat 110.

Figure 4:
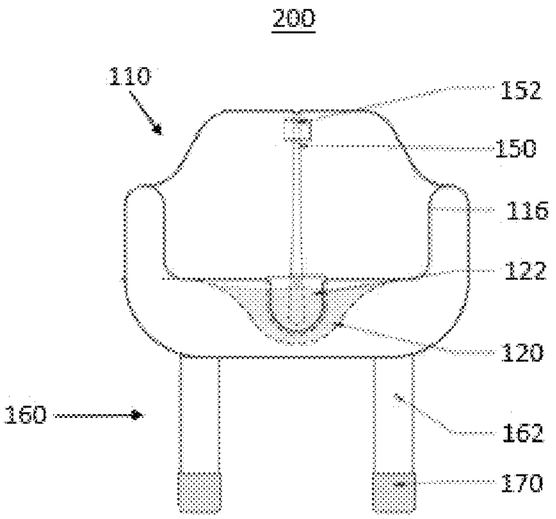
FIG. 4 is a front view of a second embodiment of a soaking chair.
Figure 5:
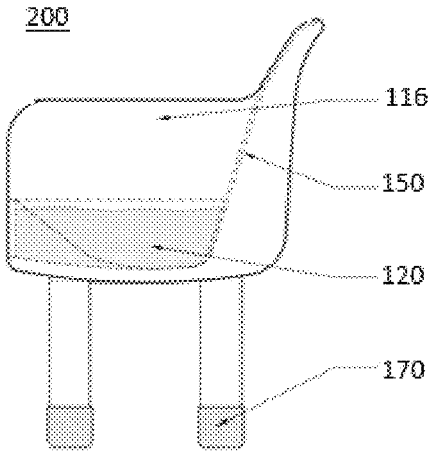
FIG. 5 is a side view of a second embodiment of a soaking chair.
Figure 6:
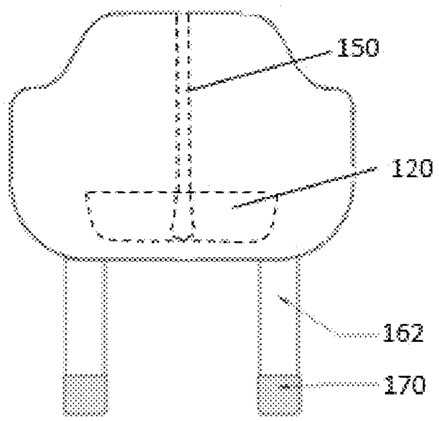
FIG. 6 is a back view of a second embodiment of a soaking chair.

In another embodiment, the void 138 may start at a top edge 102 opening 144 on the seat back 112 and extend down to the water opening 132, wherein the void 138 is in fluid communication with the reservoir 120 via the water opening 132. The void 138 may be wide enough to fit a filling hose. A hose may be placed above or inside the void 138 to fill the soaking chair 100, the void 138 may be manually filled with water from a pitcher, or the chair 100 may be placed under the shower's water stream to slowly fill via the void 138 and the reservoir 120. In another embodiment of a soaking chair 200, as shown in FIGS. 4-6, the seat back 112 may comprise a trough-like recessed channel 150 which extends from the top of the seat back 112 down to the water opening 132. The recessed channel 150 can be sized to accommodate and/or secure a filling hose. The soaking chair may comprise a holding means 152 for holding the filling hose in place. The holding means 152 may be a loop of elastomeric material to stretch around the hose, a clip, a cavity the hose can snap into, or the like.

Standard medical chairs have an 18-inch seat width. Chairs larger than this are generally designated as heavy-duty or bariatric chairs. The bucket seat 110 can be from about 10 inches to about 52 inches wide, or from about 15 inches to about 20 inches wide, or from about 20 inches to about 32 inches wide. There may be multiple size offerings of a soaking chair, for instance, an array of soaking chairs, wherein at least one chair is less than about 24 inches wide and another chair is at least about 30 inches wide. In certain embodiments, the soaking chair is designed exclusively for bariatric users and is greater than about 24 inches wide.

Figure 7:
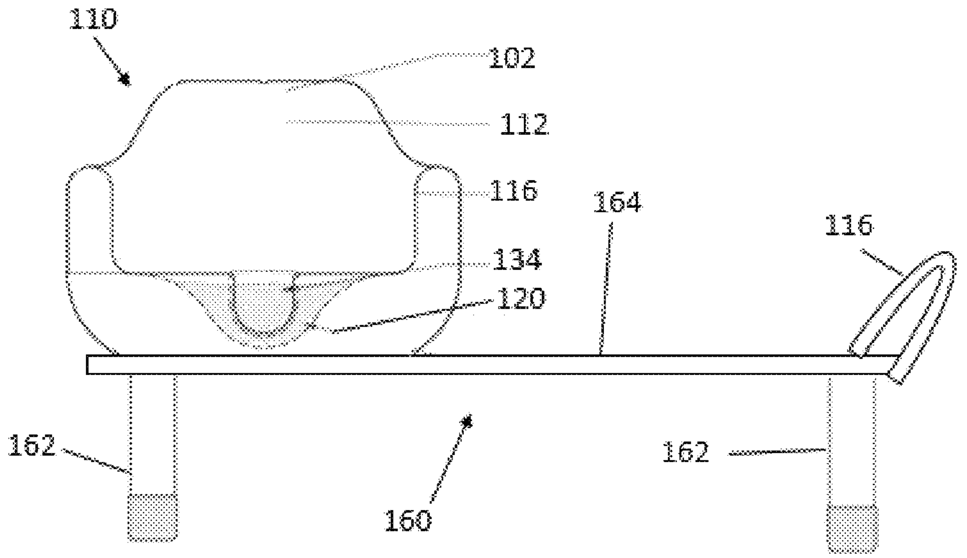
FIG. 7 is a front view of a combination soaking chair and toilet-transfer bench.
Figure 8:
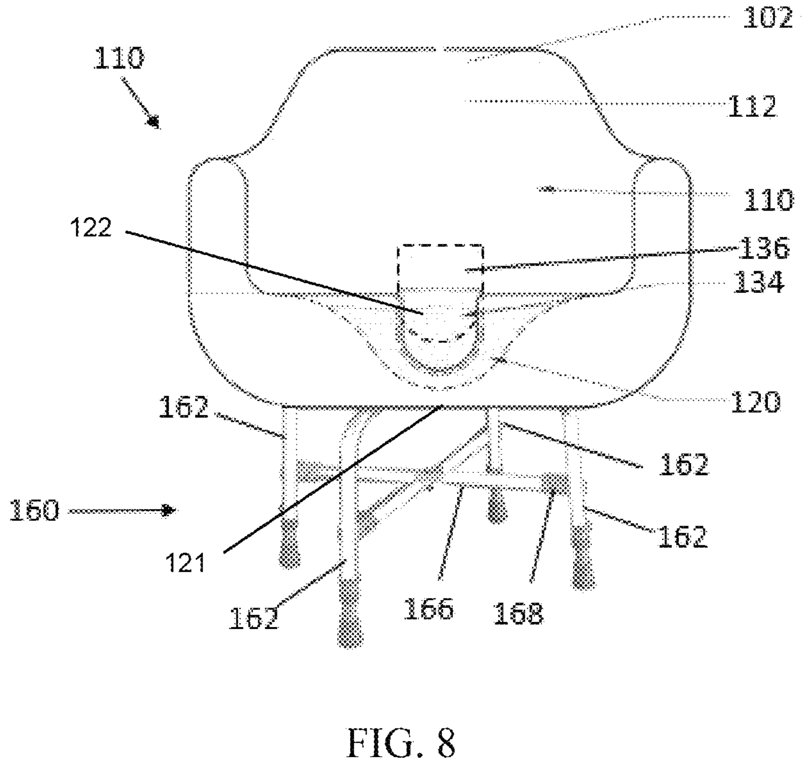
FIG. 8 is a perspective view of a soaking chair comprising cross braces.

The soaking chair requires a sturdy and slip-resistant support structure 160 to support the bucket seat 110. In a preferred embodiment, the support structure 160 comprises four legs 162. The legs 162 may removably attach to, irremovably attach to, or be molded integrally with the bucket seat 110. The legs 162 may be attached to the underside of the bucket seat 110 by snapping or screwing them into place, or the like. The legs 162 may attach to or be integral with a frame or bench 164 that in turn attaches to the bucket seat 110; this may be a preferred embodiment for bariatric soaking chair or a bucket seat 110 connected to a bench 164 as shown in FIG. 7. In addition, to provide extra support for a bariatric patient, the legs 162 may be connected with width/depth cross braces 166 attached with aircraft-type rivets 168, as shown in FIG. 8. In some embodiments, the leg height is adjustable in increments, for example, in about 1-inch increments. In some embodiments, the legs 162 are able to retract or fold up for storage. The legs 162 may be made of anodized aluminum, steel having an epoxy/polyester powder coating, or other water-resistant, light-weight, sturdy, durable, medical-grade, and/or corrosion-proof materials. The legs 162 may be angled outward from the seat bucket 110 to create a wider structure. The legs 162 may comprise slip-resistant feet 170 made out of rubber or similar material that contact the floor to provide additional stability; these feet 170 may be suction-style. In the case of a molded support structure, as shown in FIGS. 10-17, legs 162 may comprise an integrally-molded attachment mechanism 172 for attaching rubber socks/feet 170 or the like to the legs 162. This method allows feet 170 to be changed as needed due to wear, dirtiness, etc.

The support structure 160 height is from about 12 inches to about 24 inches, or from about 14 inches to about 22 inches. In a preferred embodiment, the legs 162 are integrally molded with the bucket seat 100 and are angled outward from the seat bucket 110 to create a wider, more stable chair. In other embodiments, the support structure 160 may comprise a means for suspending a soaking chair comprising a seat surface 112 having a reservoir 120 over a bathtub by securing the chair to two opposing bathtub wall top edges.

Standard medical chairs have a 250-pound weight capacity. In a preferred embodiment, the soaking chair can support a patient weighing up to 600 pounds. In other embodiments, the soaking chair can support patients weighing from zero to about 350 pounds, or from about 20 to about 120 pounds (sized for an average child), or from about 100 to about 200 pounds (sized for a larger child or small-to-average adult), or from about 100 to about 300 pounds (sized for a larger adult), or from about 200 to about 400 pounds (sized for an even larger adult), or from about 300 to about 600 pounds (sized for a bariatric adult). In still further embodiments, the soaking chair may be designed to accommodate patients up to 1000 pounds.

The soaking chair may be designed to fit the frequency of use, storage conditions, aesthetic design, usable lifetime, budget, or the like of various target populations. For example, hospitals or skilled nursing facilities may desire a heavy-duty soaking chair made from materials which will wear well after a high volume of uses over many years, like anodized aluminum and polypropylene. These chairs may also be designed to be easily moved from room-to-room and/or stacked. For instance, the seat bucket armrests, if integral with the back and seat, may comprise indentations, holes, or handles to allow for medical staff to easily carry the chair from one location to another (e.g., cut-out handles 118 as shown in FIG. 17). These hospital-grade chairs may be made available for purchase at stores like DRIVE MEDICAL, HOME DEPOT, MEDICAL SUPPLY DEPOT, PLATINUM HEALTH, or the like. In another example, consumers may wish to buy a soaking chair for home use from a store like AMAZON, TARGET, IKEA, WALMART, BUY BUY BABY, or the like. In some embodiments, these chairs may be designed with lighter and/or thinner materials, easily disassembled and stored, and aesthetically pleasing (rather than purely functional and lowest cost like a hospital may desire). For instance, a young mother may wish to use a soaking chair infrequently and desire one that is easy to store out of sight, such as one made with removable, retractable steel legs having an epoxy/polyester powder coating and a seat bucket made of polypropylene. Or, a man with IBS may desire a soaking chair that will be used frequently and become part of his bathroom décor. This man may desire a soaking chair that is well made and stylish. In still another example, truck drivers may benefit from using the soaking chair if chairs were offered at shower facilities for professional truck drivers, such as PILOT FLYING J.

It should be understood that the present invention may be combined with other pre-existing and yet-to-be invented durable medical equipment. For example, the bucket seat may be attached to a standard or bariatric shower chair, shower seat, shower bench, toilet-transfer bench (as shown in FIG. 7), swivel or rotating shower chair, or the like. The bucket seat may be attached to the support structure in a way that allows the bucket seat to slide, rotate, or swivel. The soaking chair may be designed to be ADA compliant.

Figure 9:
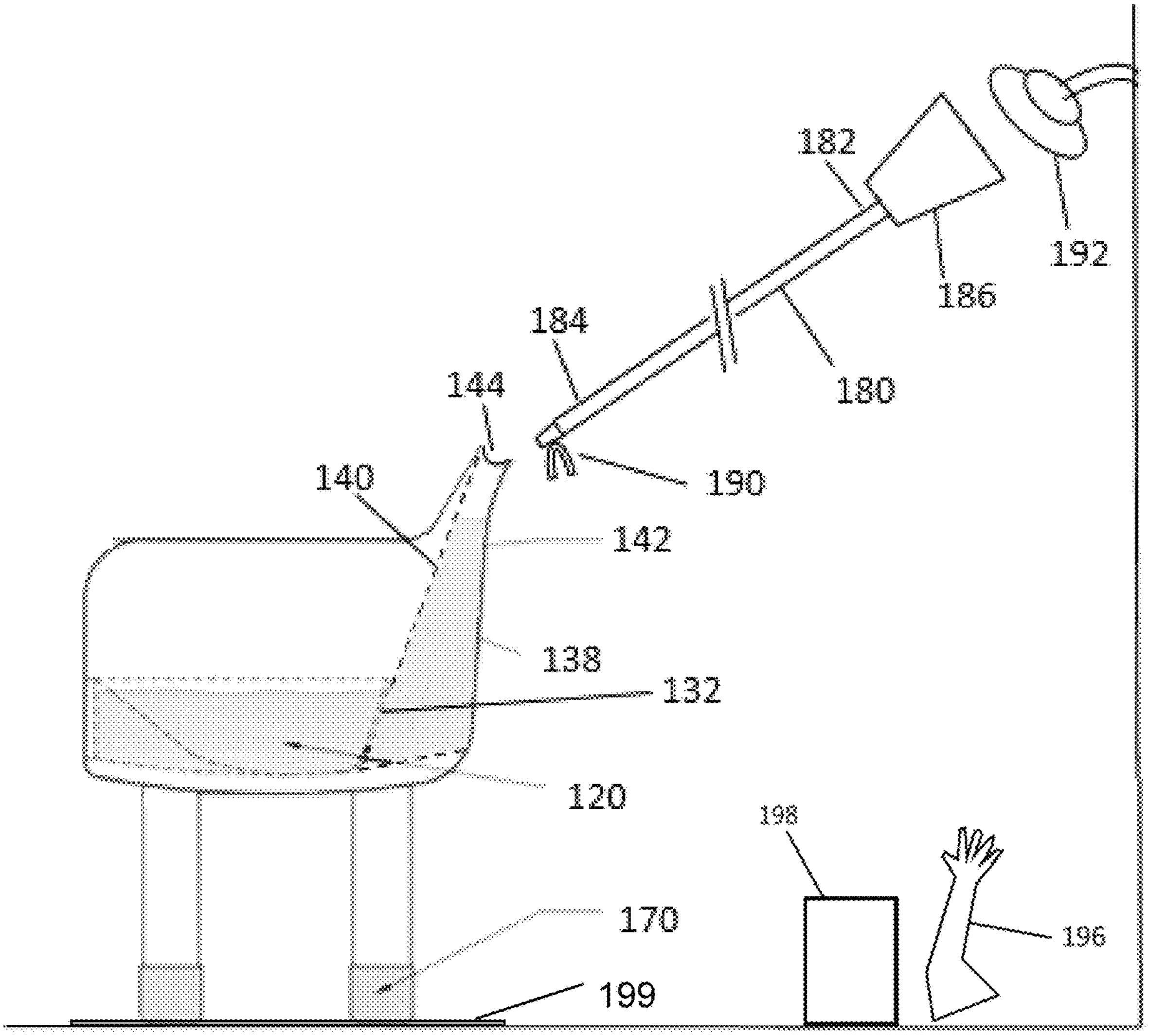
FIG. 9 is an exemplary soaking-chair-and-hose system also showing disposable towels and disposable gloves.
Figure 10:
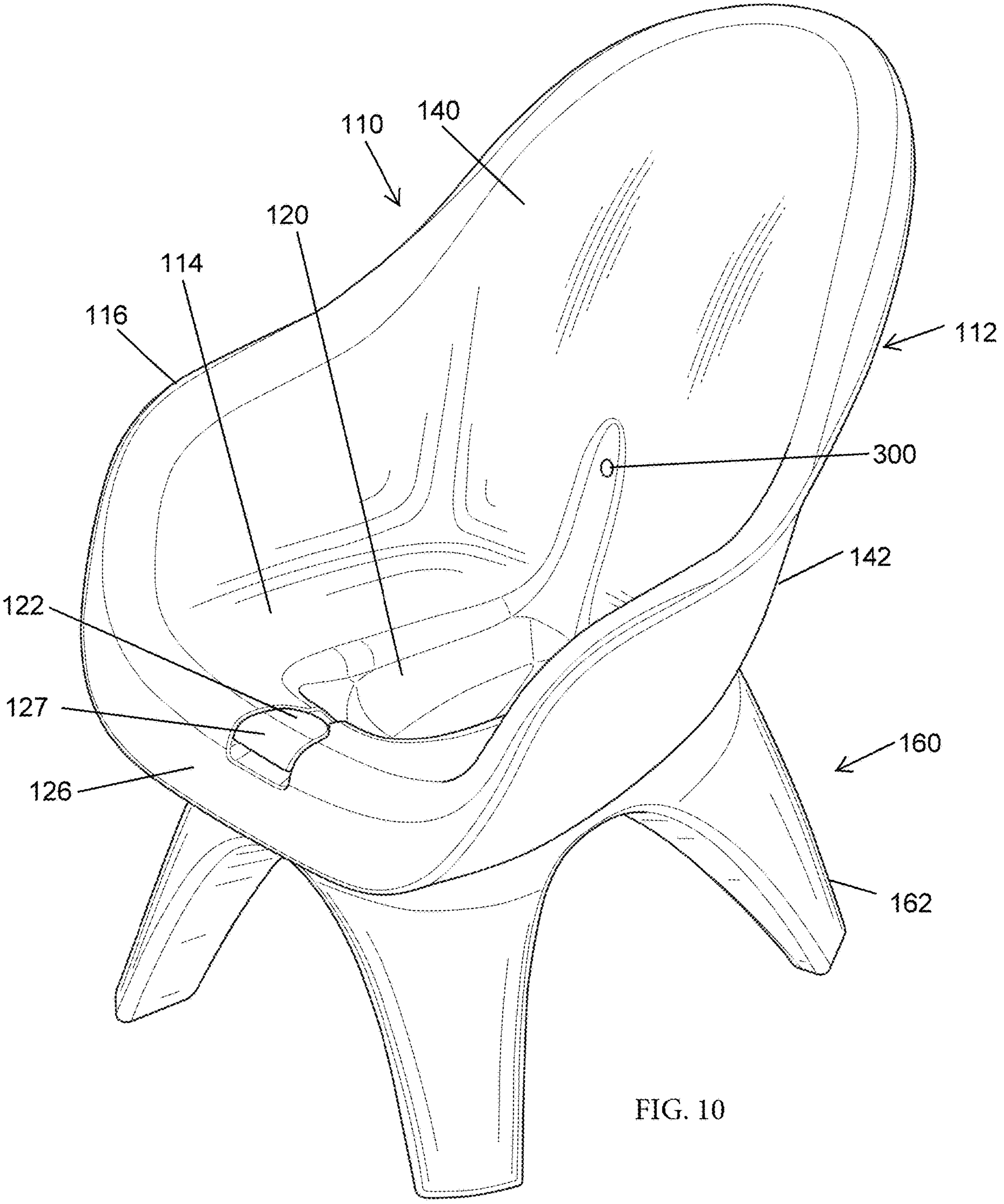
FIG. 10 is a front perspective view of a third embodiment of a soaking chair.
Figure 11:
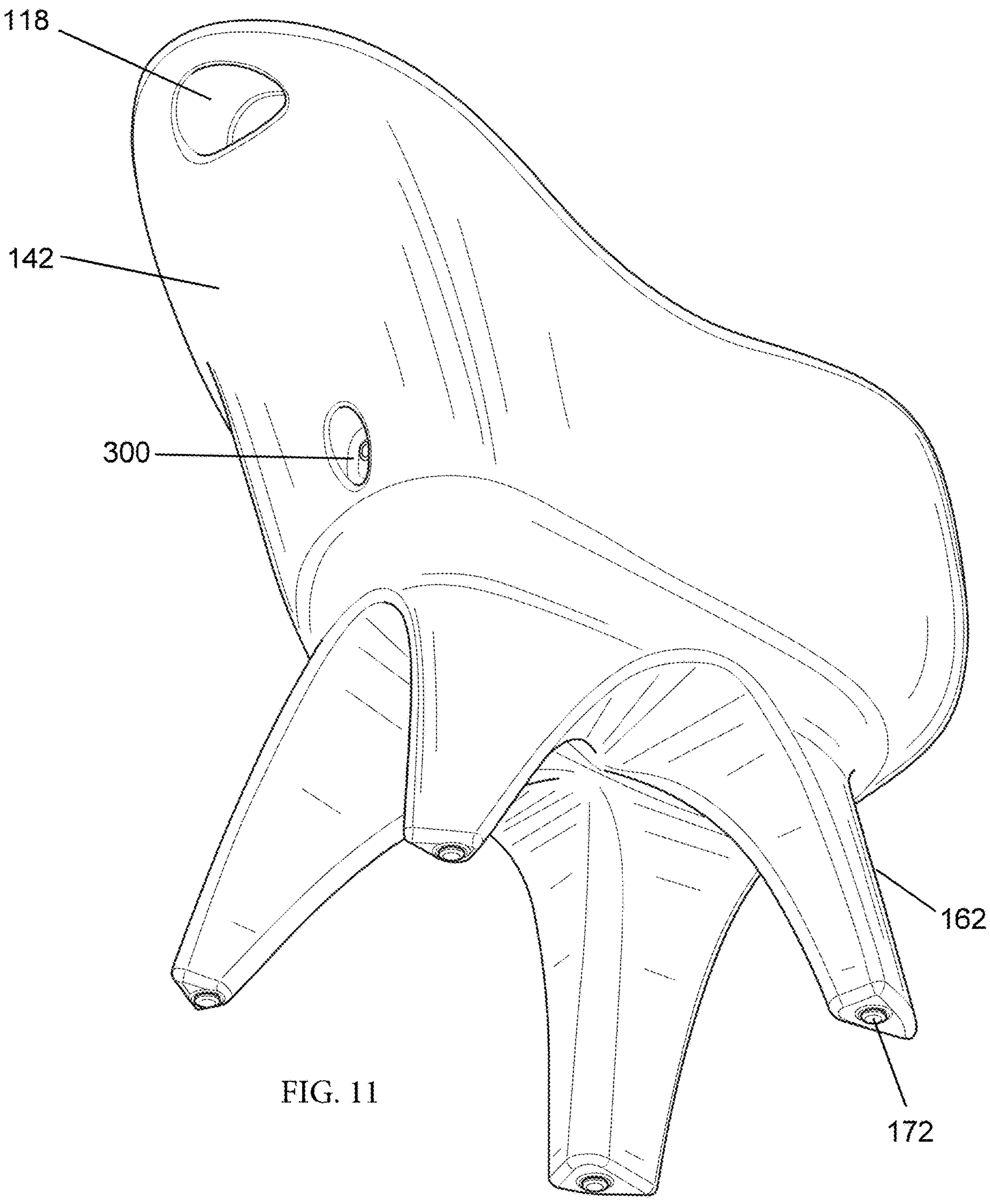
FIG. 11 is a back perspective view of the third embodiment of the soaking chair.

As shown in FIG. 9, a filling hose 180 may be used to fill the soaking chair with water from a water supply such as a showerhead, bathtub faucet, or sink faucet. The filling hose 180 may also be used for cleaning the soaking chair. The hose 180 comprises an inlet end 182 and an outlet end 184. The inlet end 182 is attachable to the water supply. In one embodiment, the outlet end 184 is held by the person filling the chair, but in a preferred embodiment, the outlet end 184 is removably attached to the hose connection port 300. The outlet end 184 may be attached to the soaking chair by a holding means 152. The holding means 152 may be a loop of elastomeric material to stretch around the hose, a clip, a cavity the hose can snap into (like the recessed channel), or the like.

The hose 180 is detachable from the soaking chair to allow for cleaning, storage, and usage of the chair without the hose 180 (e.g., when a full shower is desired). The hose 180 is made of a flexible material, e.g., silicone, rubber, antimicrobial material, chrome, etc. The inlet end 182 comprises a means 186 to attach the hose 180 to the water supply. For instance, the inlet end 182 may comprise a hose cover 186 that is able to be stretched on/over and off of a showerhead, bathtub faucet, sink faucet, or the like. The hose cover 186 is preferably made out of thermoplastic elastomer, thermoplastic rubber, PVC, ABS, or the like. The hose 180 may be from about 2 feet long to about 10 feet long, or from about 4 feet long to about 7 feet long. In a preferred embodiment, the hose 180 is about 6 feet long; this is the preferred length for filling the soaking chair from a showerhead 192. The outlet end 184 of the hose 180 may comprise a positioning device 190 like a clamp or clip which allows the hose to be secured to the soaking chair during filling and/or use of the chair.

As hinted to earlier, another embodiment of the soaking chair is shown in FIGS. 10-16. This embodiment comprises an integral seat back 112, seat surface 114, armrests 116, and support structure 160. This embodiment shows a hose connection port 300 located in the lower portion of the seat back 112. In a preferred embodiment, the hose connection port is less than about 12 inches, or less than about 8 inches, or less than about 4 inches away from the reservoir 120. Keeping the water at a low level allows a user to sit in the chair while still wearing clothing on the upper half of their body, if desired. FIG. 17 shows a similar embodiment of a soaking chair with cut-out handles 118 in the armrests 116.

FIGS. 18-20 show additional embodiments of the soaking chair of the present invention. In these embodiments, one or more of the support structure 160, seat back 112, seat surface 114, and armrests 116 is not integral. The reservoir 120 and seat surface 114 may be designed and sized to create various embodiments, for instance, best for particular user/patient populations (e.g., children, elderly, bariatric, disabled), particular uses/ailments (e.g., the design may provide hydrotherapy to the hips and/or low back, or the anogenital region only), and the like. The shape of the reservoir 120 may be generally square, generally rectangular, generally triangular, generally oval, generally oblong, generally circular, generally kidney, generally hourglass, or organic. The reservoir 120 may be symmetrical or asymmetrical. In some embodiments, the reservoir 120 comprises a drain plug 122.

A preferred embodiment for using the soaking chair (to obtain constantly flowing, temperature-controlled water) without taking a full shower is as follows. First, if not fixedly attached, snap the legs of the chair into place. Place the chair in a shower stall or bathtub and position the chair to face away from the showerhead (so that the back of the chair is closest to the showerhead). A hose connection port 300 may be used multiple ways. A first way: the chair 100 may be placed in a shower with the seat back 112 facing a showerhead 192; a hose cover 186 at an inlet end 182 of a hose 180 may be slipped over the showerhead 192 and an outlet end 184 of the hose 180 may be placed in the hose connection port 300 in the soaking chair to fill the reservoir 120. A second way: the chair 100 may be placed in a shower with the seat back 112 facing a showerhead 192; an inlet end 182 of a hose 180 is connected to a shower arm diverter and an outlet end 184 of the hose 182 is placed in the hose connection port 300 in the soaking chair to fill the reservoir 120. The hose connection port 300 is sized to accommodate common hose diameters. Turn on water to desired temperature and fill reservoir. Add any desired therapeutic additives, such as Epsom salt. Sit in the chair (or assist patient into chair) and submerge lower back, hips, buttocks and/or anogenital area in warm or cool, continuously circulating water. Alternatively, before sitting in the chair, patient can turn off flow of water to soak intermittently and add additional warm or cool water as needed. Soak as long as desired or recommended by medical professional. Adjust water flow rate or temperature as needed. When the soak is complete, the water is drained (by patient or caregiver) into the existing floor drain in the shower/bathtub by lifting the water-tight drain plug located near the front of the chair. After use wipe down with antibacterial and/or peroxide wipes (such as Clorox® wipes) (or Joint Commission recommended cleaning supply). An alternative embodiment that a DIY home user relies on a split-flow adapter (obtainable at a hardware store) that attaches to the showerhead instead. In this embodiment, the showerhead must be removed before attaching the split-flow adapter, therefore this is not a preferred embodiment, but there are some users that may prefer this method.

A preferred embodiment for using the soaking chair (to obtain constantly flowing, temperature-controlled water) while taking a shower is as follows: follow the steps listed above but omit the steps relating to the hose. In this use case, the individual may position the chair in the shower such that the water streaming out of the showerhead will hit the sloped seat back 112 and slowly fill the reservoir (via the water runoff from the chair or patient's body or, if present, via a recessed channel or opening located at the back of the chair) over time. This method of filling and circulating water will most likely involve the individual getting wet, so it is preferred when the patient intends to take a shower anyway.

Rather than using a hose or full shower to fill the reservoir, further embodiments for using the soaking chair involve using wet towels or a pitcher. Towels may be soaked in warm or cool water and placed in the reservoir; this can provide an extra level of comfort and make for easy cleanup. The reservoir may be filled by turning on a sink or bathtub faucet, filling a pitcher (or other container), and emptying the pitcher into the chair's reservoir. These methods may be the most effective when a full shower is not desired because it may be easier to control the flow of water and minimize a slippery floor surface. While the soaking chair was designed for use in the privacy of a shower stall, less water is generally involved with these methods, so it is possible that the soaking chair could be used in a location other than a shower stall or bathtub if desired (and if the privacy is acceptable). For instance, a new mother may want to use the soaking chair with wet towels in a hospital room or rent or buy one for use in her home bathroom or nursery and sit in it while she nurses her baby to promote healing and pain relief. A plastic floor liner, a bathmat, or bath towel may be laid out on the floor under the soaking chair to catch any accidental spills.

While warm or hot water is most commonly recommended for soaking, sometimes cool water is recommended. Further, sometimes alternating warm and cool water temperatures is recommended. Alternating temperatures is impossible to accomplish with one toilet and impractical with one bathtub. Alternating between hot and cold water is easily accomplished with the present soaking chair. For example, when warm-cold intervals are recommended, after soaking in warm water for about 5 to about 20 minutes, the drain plug may be lifted so that the reservoir may be drained, then the soaking chair may be filled with cold water for a second soaking session. When using the hose soaking method, water temperature may be adjusted by a caregiver (by adjusting the faucet from hot to cold or cold to hot) without the need for the patient to even stand up. Or, a patient can stand up and change the temperature themselves. Still, this is easier than dumping a traditional in-toilet sitz bath and refilling it with a different temperature water (all while likely naked from at least the waist down).

Various parts of the above embodiments may be combined to create a customized experience for a patient. For instance, a full shower soak including towels may be the best therapy for a particular diagnosis. In addition, other devices may be used in combination with the soaking chair, such as non-slip mats 199, grab bars, or wedges.

The hydrotherapy soaking chair may be the cornerstone of a cleansing/healing system that includes two or more components selected from the group consisting of: a soaking chair, one or more disposable shoulder gloves 196, one or more additives, and one or more disposable towels 198, and a barrier cream.

Long-handled, self-assist, toilet-paper wiping wands exist to enable people with limited mobility or inability to reach a means for wiping after using the toilet. These can be very ineffective—they are often hard to maneuver and people can lose the previously-attached toilet paper or the entire wand. A need exists for a better way to wipe oneself Instead of the currently available wiping wands, which can be difficult to use and ineffective, a disposable shoulder length glove may aid those patients who are obese or have limited range of motion in wiping themselves and regaining their independence in this most personal bathroom task. These gloves extend beyond the elbow to the upper arm or shoulder.

Various additives may be used in the reservoir: water, medicines (e.g., LOTRIMIN for a yeast infection, pain relievers), Epsom salt, essential oils (e.g., tea tree oil), baking soda, sea salt, vinegar, witch hazel, olive oil, saline water, pH-balanced cleansers, and combinations thereof. Additives may provide acute benefits, long term benefits, or both. They may reduce pain and promote healthy skin.

Disposable drying towels may be used to pat dry the anogenital area. Disposable towels can be thrown away if they become soiled (which eliminates the stress and embarrassment of feces, blood, and/or urine stained bath towels) or let dry if they are still clean after use.

Barrier cream such as petroleum jelly rubbed onto anogenital area can keep the damaging feces and urea from coming in direct contact with skin until the next soak can be performed.

This soaking chair will become part of physician-recommended therapy for both adult and pediatric patient diagnoses and related procedures including, but not limited to: cancer, pre- and post-childbirth, hemorrhoids or piles, BPH (benign prostatic hyperplasia), STIs (sexually transmitted infections), lumbago (lower back pain), chronic pain, perineal pain, elevated anal pressure, PID (pelvic inflammatory disease), inflammatory bowel disease, uterine cramps, rectal spasms, intense itching in the anal area, ovarian or prostate pain, incontinence, chronic constipation, painful bowel movements, anal fissures, coccydynia (chronic coccyx pain), yeast infections, bladder infections, UTI (urinary tract infection), vaginal infections, prostate infections, episiotomy discomfort, interstitial cystitis, fibromyalgia, anogenital trauma, skin breakdown, sciatica, rheumatoid and/or osteoarthritis of lower back/hips, sundowning, autism, and sexual assault. Additionally, the soaking chair may simply be used to clean the anogenital area, buttocks, lower abdomen, hips, or lower back. For instance, it is common for the anogenital area of an immobile patient to become crusted with fecal matter; this can lead to skin breakdown and rash and can be quite painful and difficult to remove. The soaking chair may be used multiple times a day.

In addition to the primary uses of the soaking chair, it may also be used for other activities where a user can benefit from the use of a stable and safe chair. For instance, a user may use the soaking chair to do seated exercises and/or stretches. The user may do exercises while seated in the chair in a private, warm environment like their shower, or, the user may do exercises while seated in the chair outside the shower. Or, in other embodiments, the soaking chair may also be used for traditional cold/hot dry therapy, such as with heating pads, heat packs, ice packs, or the like. In these scenarios, the reservoir may be used as a receptacle for receiving these heating and cooling inserts. The inserts may even be designed specifically for use with the soaking chair, thus mirroring the dimensions of the reservoir. These other activities make the soaking chair even more versatile and necessary. In some instances, the chair may be used mostly in a place other than a shower or bathtub. For these situations, an insert made of the same or similar material as the soaking chair may be used to fill the reservoir and create a comfortable, generally smooth seat surface 114. In addition, a slipcover may be used to cover the chair. The slipcover may be sized precisely to the contours of the soaking chair with a premium fabric to provide a designer look and feel. Or, the slipcover may be made of a material similar to massage table sheets, scrubs, or a hospital gown that will be subject to high frequency use and laundering, for instance if the slip covers are used in a skilled-nursing facility. These inserts and slipcovers may be sold with the chair as a kit or may be available separately from the same or different manufacturers or retailers as the soaking chair.

While specific embodiments of the inventor's novel invention were illustrated and described herein, variations and modifications may be made by those skilled in the art without departing from the scope of this disclosure. The present disclosure is for purposes of illustration and not of limitation; it may take many forms other than those explicitly disclosed herein. As such, the claims below shall be read to include all obvious variations and modifications that may be within the spirit of this invention.

What is claimed is:

1. A soaking chair comprising:

a seat surface and a support structure;

wherein the chair is designed for use in a shower; and wherein the seat surface is double-walled and comprises a soaking reservoir.

2. The soaking chair of claim 1, further comprising a hose connection port.

3. The soaking chair of claim 2, wherein the chair comprises a seat back and the hose connection port is located in the seat back.

4. The soaking chair of claim 1, wherein the soaking reservoir is at least about 2 inches deep.

5. The soaking chair of claim 1, further comprising a holding means which allows a water supply to be secured to the chair.

6. The soaking chair of claim 1, further comprising a pluggable drain.

7. The soaking chair of claim 1, wherein the soaking reservoir allows soaking of at least a portion of a user's anogenital region.

8. The soaking chair of claim 1, wherein the chair allows soaking of at least a portion of a user's lower back, hips, buttocks, or combinations thereof.

9. A soaking chair comprising:

a seat surface and a support structure;

wherein the chair is designed for use in a shower and comprises a hose connection port;

and wherein the seat surface comprises a soaking reservoir.

10. The soaking chair of claim 9, wherein the soaking reservoir is at least about 2 inches deep.

11. The soaking chair of claim 9, wherein the chair comprises a seat back and the hose connection port is located in the seat back.

12. The soaking chair of claim 9, further comprising a holding means which allows a water supply to be secured to the chair.

13. The soaking chair of claim 9, further comprising a pluggable drain.

14. The soaking chair of claim 9, wherein the soaking reservoir allows soaking of at least a portion of a user's anogenital region.

15. The soaking chair of claim 9, wherein the chair allows soaking of at least a portion of a user's lower back, hips, buttocks, or combinations thereof.

16. A soaking chair comprising:

a seat surface and a support structure;

wherein the chair is designed for use in a shower and comprises a holding means which allows a water supply to be secured to the chair; and wherein the seat surface comprises a soaking reservoir.

17. The soaking chair of claim 16, wherein the soaking reservoir is at least about 2 inches deep.

18. The soaking chair of claim 16, further comprising a pluggable drain.

19. The soaking chair of claim 16, wherein the soaking reservoir allows soaking of at least a portion of a user's anogenital region.

20. The soaking chair of claim 16, wherein the chair allows soaking of at least a portion of a user's lower back, hips, buttocks, or combinations thereof.

* * * * *